US006491219B2

(12) United States Patent
Brentini

(10) Patent No.: US 6,491,219 B2
(45) Date of Patent: Dec. 10, 2002

(54) MODULAR PRICE INDICATOR

(76) Inventor: Attilio Brentini, 46, Avenue Rochettaz, 1009 Pully (CH)

( * ) Notice: Subject to any disclaimer, the term of this patent is extended or adjusted under 35 U.S.C. 154(b) by 0 days.

(21) Appl. No.: 09/791,782

(22) Filed: Feb. 26, 2001

(65) Prior Publication Data

US 2001/0017316 A1 Aug. 30, 2001

(30) Foreign Application Priority Data

Feb. 25, 2000 (IT) ........................................ MI00A0359
Sep. 29, 2000 (IT) ....................................... MI000552 U

(51) Int. Cl.[7] ................................................ G06K 15/00
(52) U.S. Cl. ........................... 235/383; 186/56; 186/57; 283/36; 283/107
(58) Field of Search ............................ 235/383; 186/56, 186/57; 283/36, 107

(56) References Cited

U.S. PATENT DOCUMENTS 2,875,540 A * 3/1959 Walters ....................... 40/140
3,234,678 A * 2/1966 Buren, Jr. .................... 40/143
3,358,398 A * 12/1967 Chalfin ........................ 40/214
4,043,116 A * 8/1977 Schlappi ........................ 58/88
D255,584 S * 6/1980 Brentini ....................... D18/29
4,334,372 A * 6/1982 Colmar ............................ 40/5
D274,774 S * 7/1984 Brentini ....................... D6/483
4,497,125 A * 2/1985 Hutchison ...................... 40/10
5,012,997 A * 5/1991 Hutchison ................ 248/220.4
5,397,087 A * 3/1995 Teece ...................... 248/270.2

* cited by examiner

*Primary Examiner*—Thien M. Le
*Assistant Examiner*—Seung Ho Lee
(74) *Attorney, Agent, or Firm*—Young & Thompson

(57) ABSTRACT

A modular indicator of a price or of any information relating to an article on display comprising a plurality of units which can be fixed each to the following other along a longitudinal axis of composition for the modular indicator, wherein each unit in turn comprises a support mount and an alphanumerical segment cantilevered on the support mount.

6 Claims, 3 Drawing Sheets

MODULAR PRICE INDICATOR

FIELD OF THE INVENTION

The present invention relates to a modular price indicator.

BACKGROUND OF THE INVENTION

A type of price indicator currently available commercially, with reference in particular to the sector of luxury items or valuable goods, such as for example gold articles or timepieces, is formed by a longitudinal guiding metal support wherein flat alphanumerical segments can be slidingly inserted in series.

Such an indicator has some instability against tilting around its longitudinal axis and requires guiding supports with different length in order to allow composition of information with different length. Metal material which constitutes the indicator preferably made of brass, tends to oxidise and is easily scratched.

Segments are formed by shearing the metal, so that they must be finished with care for removal of shearing fin.

Finally, segment are flat and therefore difficult to handle.

Another kind of modular indicator currently available is constituted of plastic cubes which fixe each to the other along a longitudinal axis and which have an alphanumerical character pressed coplanarly or in a raised plane on the face of the cube to be shown.

SUMMARY OF THE INVENTION

The object of the present invention is that of providing a modular indicator which avoids the disadvantages suffered by indicators currently available commercially.

In particular one object of the present invention is that of providing a modular indicator easy to handle and which allows precise, practical, and rapid assembly.

Another object of the present invention is that of providing a modular indicator unexpensive.

These objects are achieved by a modular indicator in accordance with the present invention, comprising a plurality of units which can be fixed each to the following other along a defined longitudinal axis of composition for the indicator characterised in that each unit comprises an alphanumerical segment and a mount for a cantilevered support of the alphanumerical segment.

Units of modular indicator are of a plastic material which can be injected onto a mould and preferably subjected to gilding after moulding.

According to a first preferred embodiment of the invention alphanumerical segments are formed in one single part with the corresponding support mounts.

According to a second preferred embodiment of the invention alphanumerical segments are fixed to the corresponding support mounts.

Such a modular indicator has a good stability against tilting around its longitudinal axis.

Such a modular indicator made of gilded plastic material does not deteriorate in time and can be handled without risk to be damaged.

Information to be displayed is well distinguishable, the alphanumerical segments being supported in a raised plane in relation to the corresponding support mounts.

The units of the indicator are three-dimensionally shaped and can thus be handled with extreme easy.

BRIEF DESCRIPTION OF THE DRAWINGS

These advantages will be made clearer on reading of preferred embodiments of the present invention, given by way of a non-limiting example of the more general principle claimed, with the aid of the accompanying drawings in which:

DESCRIPTION OF PREFERRED EMBODIMENT

The direction of development of the indicator, denoted by "L" for the purposes of the following description will be defined as axial direction.

Figure 1:
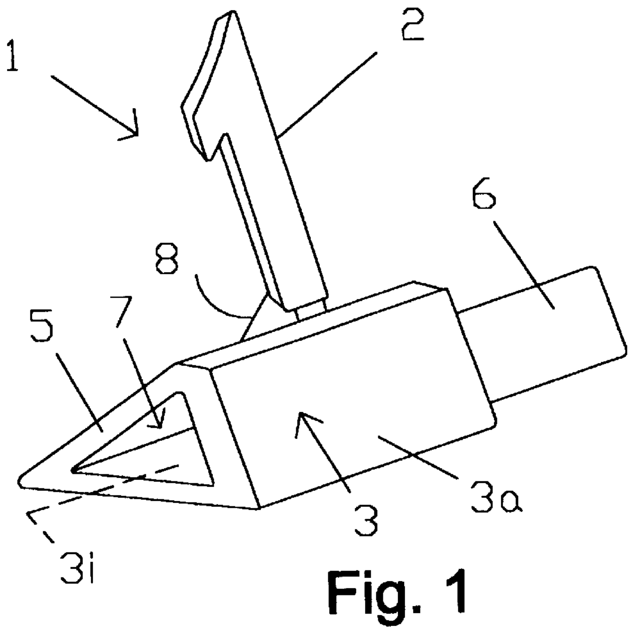
FIG. 1 is a front perspective view of a unit of the indicator of a first preferred embodiment of the present invention.
Figure 2:
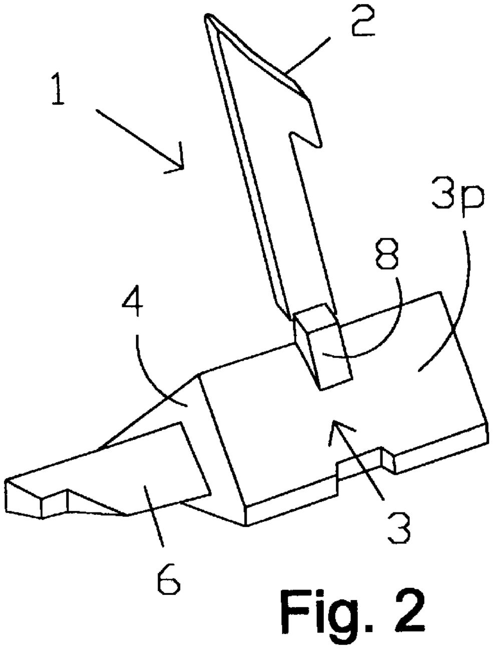
FIG. 2 is a back perspective view of FIG. 1.

With reference to FIGS. 1 and 2, a component 1 of the indicator of price or of any other information relating to an article on display comprises an alphanumerical segment 2 and a mount 3 for supporting the alphanumerical segment 2, made in a plastic material injected onto a mould and later coated by means of a gilding bath.

Figure 4:
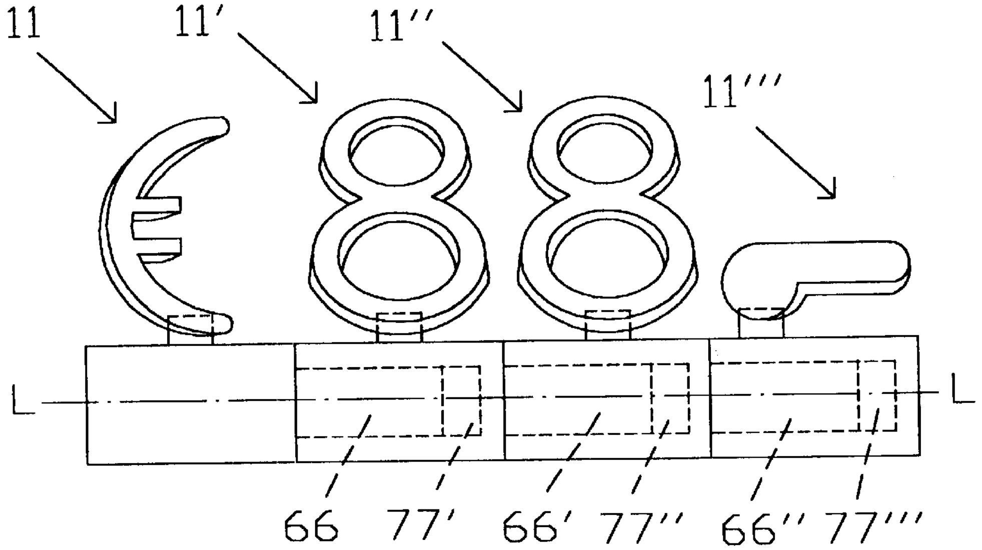
FIG. 4 is a front view of a possible composition of units of the first preferred embodiment of the present invention.

The support mount 3 is substantially a prism with a triangular base with axis arranged parallel to the axis L—L shown in FIG. 4 along which the information of the indicator is composed, and forms a lower horizontal surface **3*i* for support of the component at a support plane, a front surface 3*a* tilting backwards and a rear surface 3*p*** tilting forwards.

Means are provided, integrally with each support mount, for coupling to the support mount of the previous and/or next component with reference to the axis of composition of the indicator.

In FIGS. 1 and 2, starting from two axially opposite triangular, or also another shape, regions of the two side end bases 4 and 5 respectively of the support mount 3, a male coupling element or protuberance 6 and a female coupling element or cavity 7, with length not less than that of the protuberance 6, develop in the direction of the axis L—L of composition of the indicator.

Figure 3:
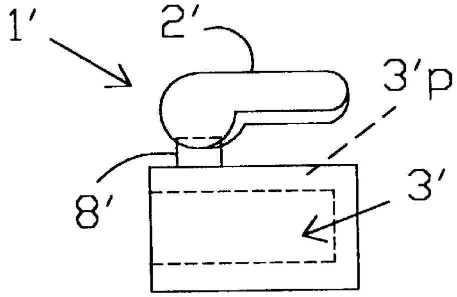
FIG. 3 is a front view of a terminal unit of the first preferred embodiment of the present invention.

FIG. 3 shows an end component 1' of an indicator composed of an alphanumerical segment 2' and a support mount 3' which in this case has only the female coupling element which can be hooked by the protuberance of the support mount of the component which precedes it in the composition of the indicator.

Contrarily the support mount of an initial component of the indicator will only have the male coupling element which can be hooked to the cavity of the support mount of the component which follows it in the composition of the indicator.

In an alternative embodiment the support mount of an initial or terminal component of the indicator may also have a male coupling element at a side end base and a female coupling element at the other side end base. This situation adapts to the case wherein the article on display has a support frame provided with a male or respectively female coupling element for hooking to the female or respectively male coupling element of the initial or terminal component of the indicator directly.

In the embodiment of FIGS. 1 and 2 the protuberance 6 is provided on the base 4 of the support mount 3 placed downstream with reference to the direction of composition of the display, but a reversed arrangement of the protuberance 6 and of the cavity 7 respectively on the base 5 and 4 respectively of the support mount 3 can also be foreseen. The reversed arrangement between the male and female coupling elements at the bases of the support mount of the segment may naturally extend to all the embodiments of the components of a modular indicator.

The segment 2, 2' is tapered from the rear face to the front face in such a way as to better show its three-dimensional shape.

The segment 2, 2' is not formed directly by the top of the support mount 3, 3' but by a block which in turn is formed in a single part by the rear wall 3*p*, 3'*p* of the support mount 3,3' and extends above the top of the support mount 3, 3'.

The base part of the segment 2, 2' extends in one single part from the front face of the block 8, 8' placed above the top of the support mount 3, 3' and remains raised in relation to the same front face of the block 8, 8'.

The segment 2, 2' extends slightly tilting backwards in relation to the vertical plane.

Each of the segments of the components of the indicator, although formed in one single part with the corresponding support mount, is raised and spatially well distinguishable from the corresponding support mount.

The composition of the indicator, by way of an example with four components in FIG. 4, takes place as follows.

The protuberance 66 of the initial component 11 of the indicator is inserted with pressure in the cavity 77' of the next component 11', the protuberance 66' of the component 11' is then inserted with pressure in the cavity 77" of the next component 11" of the indicator, and finally the protuberance 66" of the component 11" is then inserted with pressure in the cavity 77'" of the next component 11'" of the indicator.

The correct and precise insertion with pressure of the protuberance of a support mount in the cavity of the next support mount is ensured by the slight deformability of the components of the indicator.

FIGS. 5 to 10 show a second embodiment of present invention.

Figure 5:
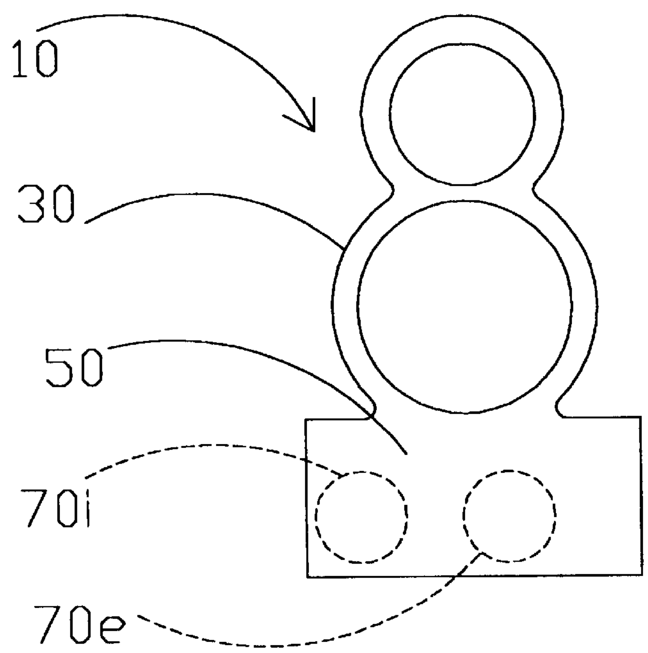
FIG. 5 is a front view of a segment of a second preferred embodiment of the present invention.
Figure 6:
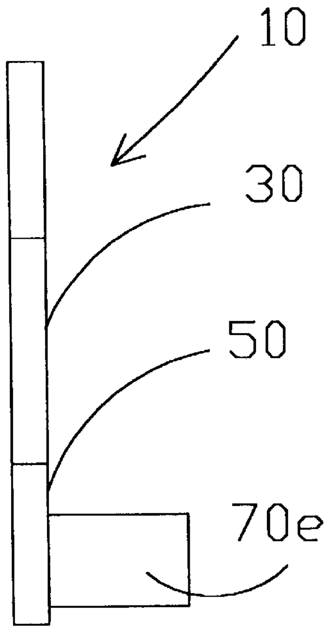
FIG. 6 is a side view of FIG. 5.

FIGS. 5 and 6 show a segment 10 formed by a small alphanumerical sign 30, in this case the number "8", by a rectangular support base 50 of the small sign 30 co-planar to the small sign 30, and by a pair of small pegs 70*e* and 70*i*, parallel and aligned and extending perpendicularly to the rear side of the support base 50. By way of an example the sign 30 has a height of 5 mm, base of 4 mm and thickness of 0.8 mm.

The segment 10 is in a plastic material subjected to final gilding by spraying, gilding bath, vacuum gilding etc.

Figure 7:
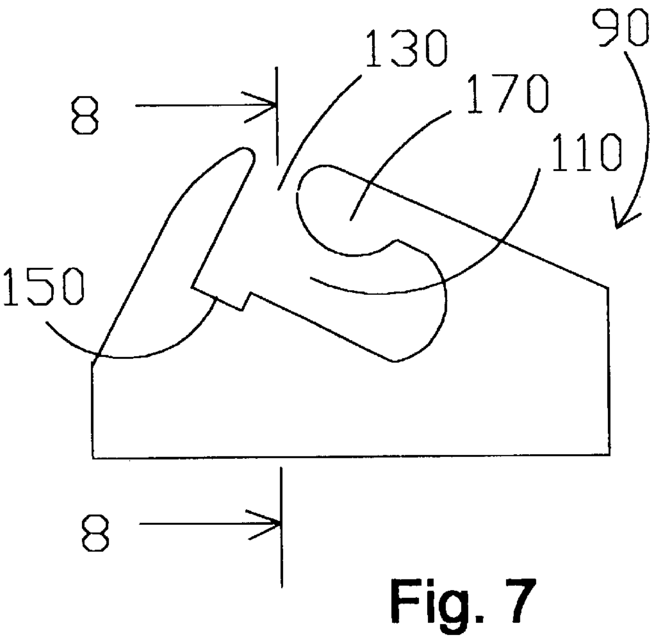
FIG. 7 is a side view of a support mount of the second preferred embodiment of the present invention.
Figure 8:
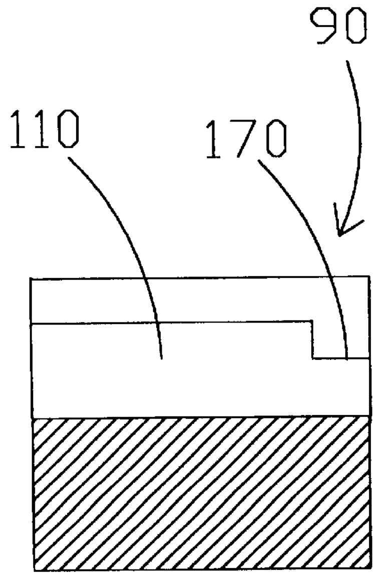
FIG. 8 is a front view of the support mount of FIG. 7 taken along line 8—8.

FIGS. 7 and 8 however show a support mount 90 for a corresponding segment 10.

The mount 90, like the segment 10, is made in a gilded plastic material and has an axial dimension substantially equal to that of the segment 10.

The upper wall of the mount 90 is also entirely grooved by an axial slot 130 which extends towards the interior of the mount 90, defining an axial cavity 110.

The cavity 110 represents an axial housing for the support and guiding of the segment 10. It extends in depth from the front part to the rear part of the segment 90 with a slant of approximately 30 degrees from a horizontal datum plane and for a section which has to be greater or at most equal to the length of the pegs 70*e* and 70*i*, and in height for a section substantially equal to the diameter of the pegs 70*e* and 70*i*.

On the internal surface of the lower wall of the cavity 110 tracks are formed parallel to the slot 130 extending along the entire axial extension of the mount 90.

Finally on the internal surface of the upper wall of the cavity 110, at one side end of the mount 90, a protuberance or small tooth 170 is provided.

The protuberance or small tooth 170 extends axially towards the interior of the cavity 110 for a section approximately equal to the minimum distance between the two pegs 70*e* and 70*i*.

Figure 9:
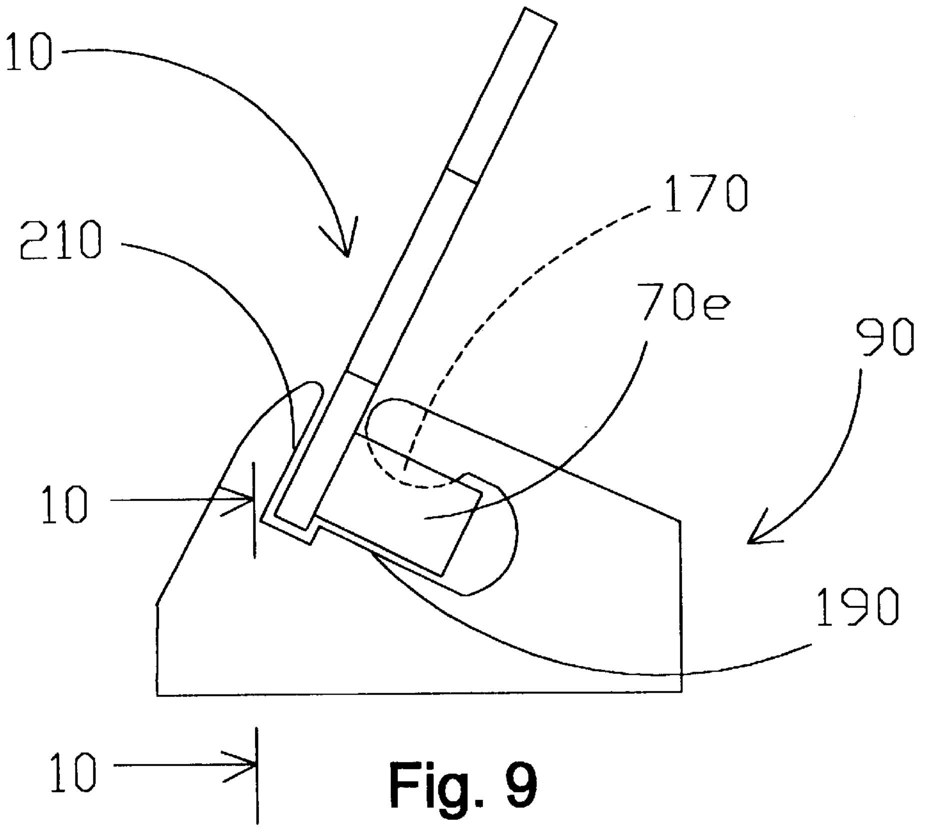
FIG. 9 is a side view of a segment-mount unit of the second preferred embodiment of present invention.
Figure 10:
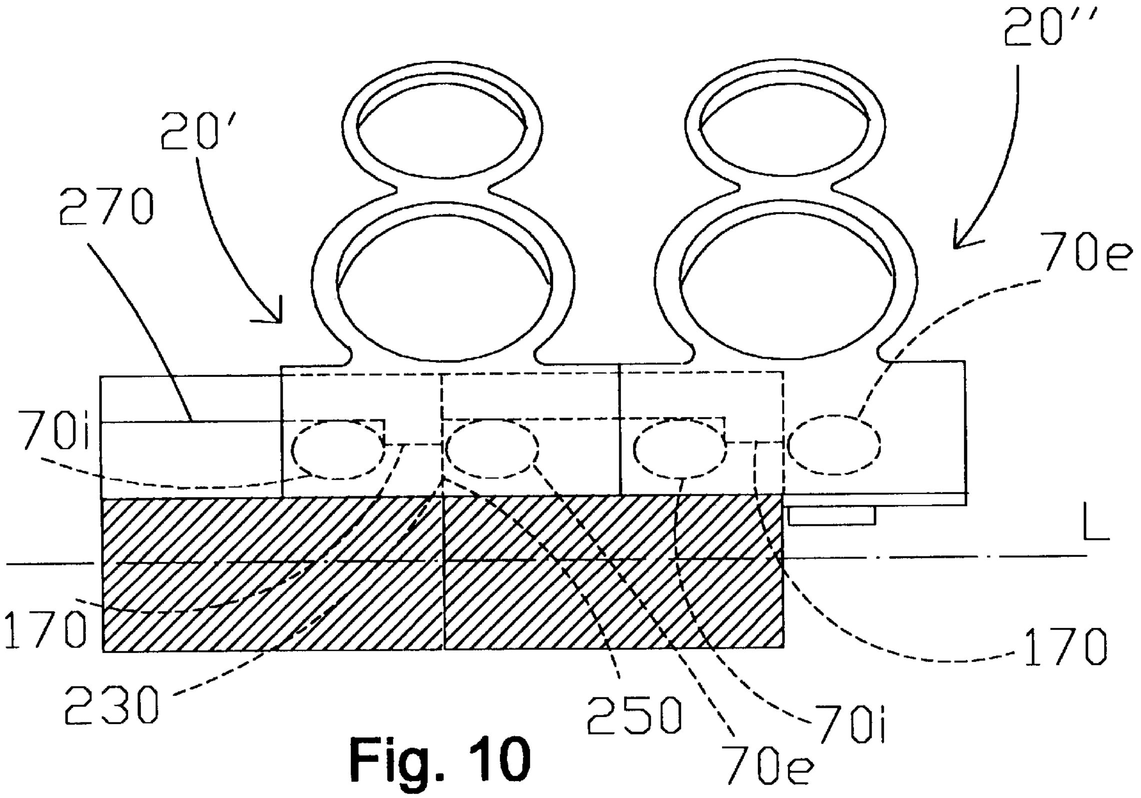
FIG. 10 is a front view of a composition of two units of FIG. 9 taken along line 10—10.

With reference now also to FIGS. 9 and 10, we will illustrate the operation of pre-assembly of a segment to the relevant support mount and the subsequent phase of hooking between the units thus pre-assembled in such a way as to represent the required price.

For the pre-assembly of a segment 10-mount 90 unit it is first necessary to place the two parts adjacently, placing the segment 10 at the side end of the mount 90 wherein the protuberance 170 is present.

After having taken the lower edge of the segment 10 to the mouth of the tracks 150 and the peg 70*i* to the side mouth of the cavity 110, an axial thrust is exerted on the segment 10 in such a way that the peg 70*i* is made to slide axially inside the cavity 110, guided not only by the tracks 150 but also by the internal surface of the lower 190 and front walls 210 of the cavity 110.

The pressure exerted by the peg 70*i* on the protuberance 170 causes elastic deformation upwards of the upper wall of the cavity 110 which in turn causes snap-engaging of the protuberance 170 in the space defined by the two pegs 70*i* and 70*e*.

The protuberance 170 placed between the pegs 70*e* and 70*i* prevents further axial sliding of the segment 10 in the mount 90, causing engaging between segment and mount intended to be no longer removed.

In this condition the part of the segment 10 with the peg 70*e* remains projected outside of the mount 90.

Pre-assembly between a segment and the corresponding support mount creates the units which can be used for all subsequent reassembly of the indicator which can be performed by the user.

Hooking between adjacent units, as we will see, is performed by means of the part of the segment 10 which is projected outside of the corresponding guide housing 110.

In order to do this, two units 20' and 20" are placed adjacently, making sure that the side 230 of the mount 90 of the unit 20' situated on the side of the protuberance 170 is placed close to the side 250 of the mount 90 of the adjacent unit 20" situated on the opposite side to the protuberance 170.

After having brought the lower edge of the segment 10 of the unit 20' to the mouth of the tracks 150 of the unit 20" and the external peg 70*e* of the unit 20' to the side mouth of the cavity 110 of the unit 20", an axial thrust is exerted on the segment 10 of the unit 20' in such a way that the external peg

70*e* is made to slide axially inside the cavity 110 of the unit 20", guided not only by the tracks 150 but also by the internal surfaces of the lower 190, front 210 and upper walls 270 of the cavity 110.

The engaging operation ends when the adjacent sides of the mounts of the units 20' and 20" are in contact.

The operation can be repeated for the hooking of additional segment-mount units according to the price or information to be composed in the indicator.

For the disassembly of the indicator into its constituent units it is sufficient to remove axially these segment-mount units one from the other with a slight traction action.

The units of the indicator disassembled in this way can be reused for composition of a new price.

After pre-assembly between a segment and the corresponding mount the user for the subsequent compositions of the indicator, will have to handle segment-mount units already composed. The small number of components to be assembled considerably reduces both the assembly time and the risk of losing the components of the indicator in time.

Naturally, in order to conclude the composition of the indicator, a neutral unit will be necessary, that is to say a mount without segment, to be applied to the final segment of the indicator, in such a way that the price shown by the segments is centered on the support provided as a whole by the series of connected mounts.

What is claimed is:

1. A modular indicator of information relating to an article on display comprising a plurality of units which can be fixed each to the following other along a longitudinal axis of composition for the modular indicator, each unit comprising a support mount and a corresponding alphanumerical segment cantilevered on the support mount, wherein said support mount comprises an axial guide and support housing for axial sliding insertion of said corresponding alphanumerical segment, snap engaging means between said support mount and said corresponding alphanumerical segment, and wherein said alphanumerical segment is in an axially staggered position in relation to the corresponding support mount and axially projects from said corresponding support mount for axially sliding insertion in the guide and support housing of the support mount of the adjacent unit.

2. The modular indicator according to claim 1, wherein said snap engaging means comprise a projecting part formed in one single part with said support mount and a recessed part formed in one single part with said corresponding alphanumerical segment.

3. The modular indicator according to claim 2, wherein a pair of parallel pegs aligned in direction of the axis of the indicator define therebetween said recessed part, and wherein a protuberance inside said guide and support housing defines said projecting part able of snap-engaging in the space between said pair of pegs.

4. The modular indicator according to claim 3 wherein said protuberance is positioned at one prefixed axial end of said guide and support housing, one peg being placed inside and one being placed outside said guide and support housing when said recessed part and said projecting part are snap engaged.

5. The modular indicator according to claim 4, wherein said peg lying outside the support and guide housing of one unit is inserted in the axial end of the support and guide housing of the support mount of the adjacent unit which is opposite to the protuberance.

6. The modular indicator according to claim 1, further comprising a terminal unit consisting of a mount.

* * * * *